United States Patent [19]

Di Santo

[11] Patent Number: 5,582,717

[45] Date of Patent: * Dec. 10, 1996

[54] WATER DISPENSER WITH SIDE BY SIDE FILLING-STATIONS

[76] Inventor: Dennis E. Di Santo, 1620 Gobel Way, Modesto, Calif. 95358

[ * ] Notice: The term of this patent shall not extend beyond the expiration date of Pat. No. 5,108,590.

[21] Appl. No.: 30,323

[22] PCT Filed: Sep. 11, 1991

[86] PCT No.: PCT/US91/06557

§ 371 Date: Apr. 26, 1993

§ 102(e) Date: Apr. 26, 1993

[87] PCT Pub. No.: WO92/04969

PCT Pub. Date: Apr. 2, 1992

Related U.S. Application Data

[63] Continuation-in-part of Ser. No. 581,023, Sep. 12, 1990, Pat. No. 5,108,590.

[51] Int. Cl.[6] ............................ B01D 17/12; B01D 65/00
[52] U.S. Cl. ........................... 210/86; 210/192; 210/248; 210/257.2; 222/2; 222/189.06
[58] Field of Search ........................ 210/767, 805, 210/774, 95, 192, 195.2, 257.1, 257.2, 259, 748, 806, 86, 121, 248, 258; 47/16; 60/648; D7/306–308, 311; 222/189, 2; D20/4, 5

[56] References Cited

U.S. PATENT DOCUMENTS

| | | | |
|---|---|---|---|
| D. 182,277 | 3/1957 | Giepen | D52/3 |
| D. 197,482 | 2/1964 | Boldt et al. | D52/3 |
| D. 207,791 | 5/1967 | Stein | D52/3 |
| D. 209,084 | 10/1967 | Moore | D20/5 |
| D. 222,704 | 12/1971 | Winsett | D20/1 |
| D. 262,894 | 2/1982 | Moore et al. | D20/4 |
| D. 283,827 | 5/1986 | Albright | D20/4 |
| D. 291,896 | 9/1987 | Stover | D20/5 |
| D. 331,264 | 11/1992 | Ellis | D20/1 |
| 2,831,609 | 4/1958 | Montbriand et al. | 222/76 |
| 3,207,281 | 9/1965 | Norris | D20/5 |
| 3,207,282 | 9/1965 | Norris, Jr. | 194/13 |
| 3,375,913 | 4/1968 | Norris, Jr. | 194/13 |
| 3,856,676 | 12/1974 | Grimme et al. | 210/259 |
| 4,160,727 | 7/1979 | Harris | 210/257.2 |
| 4,258,501 | 3/1981 | Brown | 47/16 |
| 4,347,704 | 9/1982 | Marquardt et al. | 60/648 |
| 4,501,381 | 2/1985 | Hart | 222/2 |
| 4,512,377 | 4/1985 | Greer | 141/11 |
| 4,528,093 | 7/1985 | Winer | 210/96.2 |

(List continued on next page.)

*Primary Examiner*—Joseph W. Drodge
*Attorney, Agent, or Firm*—Reinhart, Boerner, Van Deuren, Norris & Rieselbach, s.c.

[57] ABSTRACT

Disclosed is a self service water dispensing apparatus especially adapted to be located inside a grocery store. This apparatus includes a housing which provides a rigid support structure having a base section which has integral therewith a water storage tank, and an upper section immediately above the base section which includes a plurality of water filling stations. The upper section and base section are joined together and are contiguous with each other along a common generally horizontal plane located about waist high to a typical adult user. This provides a compact and convenient to use structure. The water filling stations each comprise a recessed cubicle having a top wall with a delivery spout therein, an open front side into which a water bottle is placed beneath the spout for filling, and a floor including a drain. Manually operable control switches are at each vending station. When one of these switches is actuated a pump is energized to pump water from the storage tank to the spout in the filling station associated with the manually operable control switch actuated. A reverse osmosis water purifying unit purifies water from a public supply source and delivers the purified water to the storage tank. A float detects when the level of purified water in the storage tank is low, causing water from a public supply source to be fed through the reverse osmosis unit. An ozone generator or ultraviolet light is included to kill bacteria.

7 Claims, 7 Drawing Sheets

5,582,717
Page 2

U.S. PATENT DOCUMENTS

| | | | |
|---|---|---|---|
| 4,548,060 | 10/1985 | Campbell | 70/91 |
| 4,585,554 | 4/1986 | Burrows | 210/110 |
| 4,597,509 | 7/1986 | Pereira | 222/129 |
| 4,599,166 | 7/1986 | Gesslauer | 210/96.1 |
| 4,623,467 | 11/1986 | Hamlin | 210/652 |
| 4,741,454 | 5/1988 | Ray et al. | 220/315 |
| 4,801,375 | 1/1989 | Padilla | 210/100 |
| 4,842,723 | 6/1989 | Parks et al. | 210/95 |
| 4,852,621 | 8/1989 | Bear | 141/83 |
| 4,857,184 | 8/1989 | DeLoach | 210/741 |
| 4,898,678 | 2/1990 | Johnson et al. | 210/258 |
| 4,946,599 | 8/1990 | Craig | 210/741 |
| 4,958,747 | 9/1990 | Sheets | 222/67 |
| 4,969,991 | 11/1990 | Valadez | 210/96.2 |
| 4,997,553 | 3/1991 | Clack | 210/97 |
| 5,002,664 | 3/1991 | Clack et al. | 210/251 |
| 5,064,097 | 11/1991 | Brog et al. | 222/129 |
| 5,108,590 | 4/1992 | Disanto | 210/257.2 |
| 5,112,477 | 5/1992 | Hamlin | 210/85 |
| 5,128,035 | 7/1992 | Clack et al. | 210/251 |
| 5,147,532 | 9/1992 | Leek, Jr. | 210/97 |

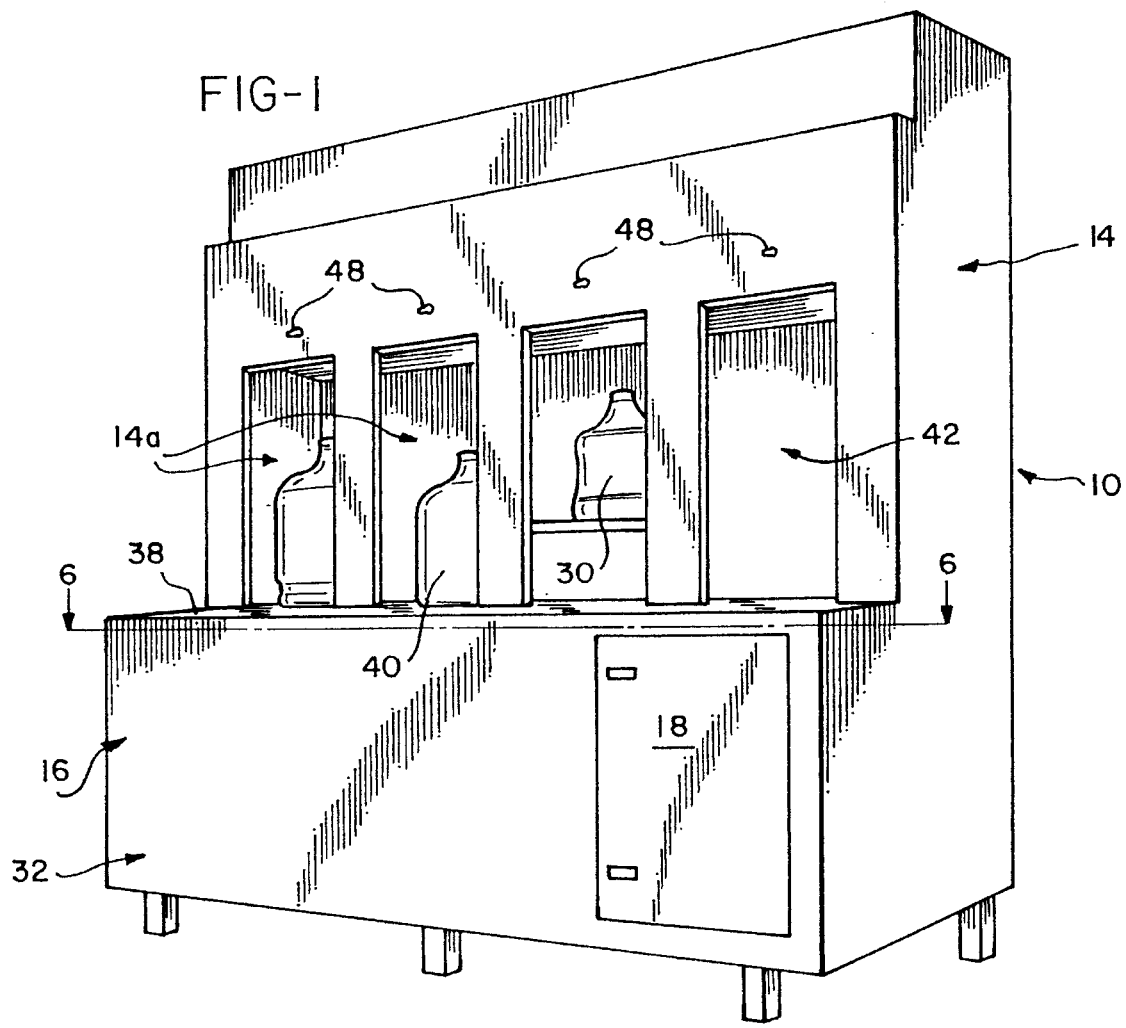

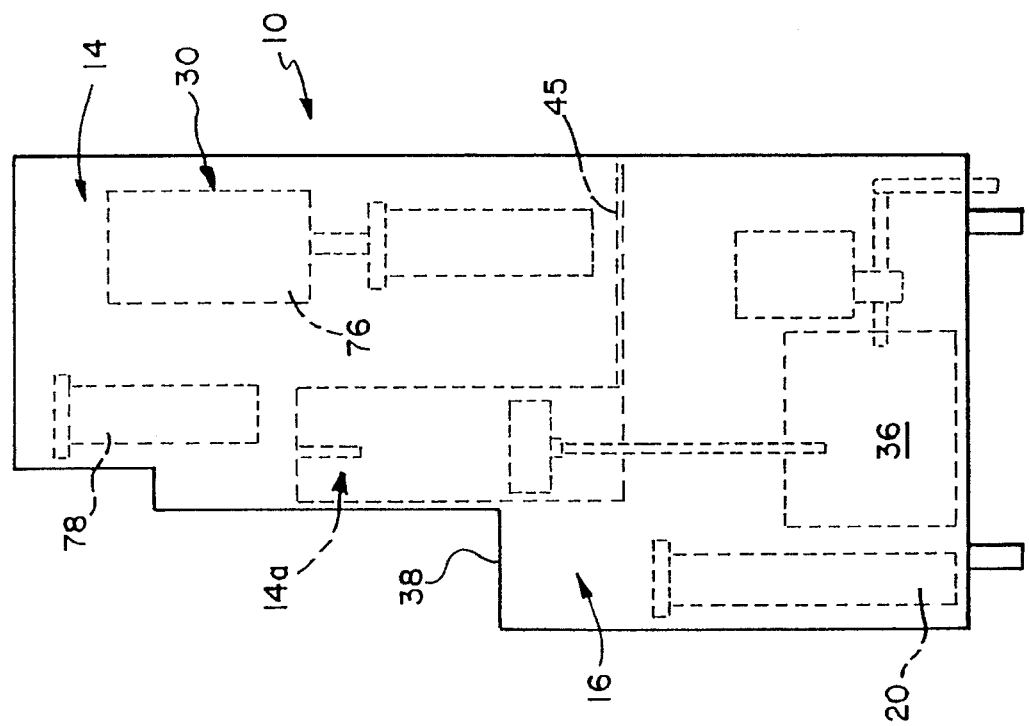
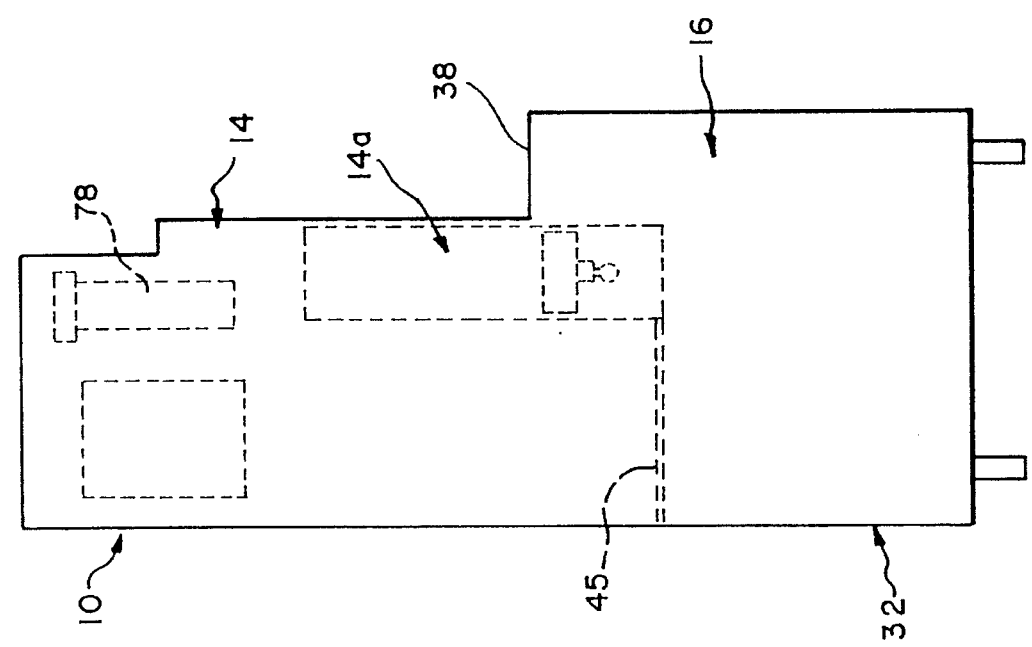

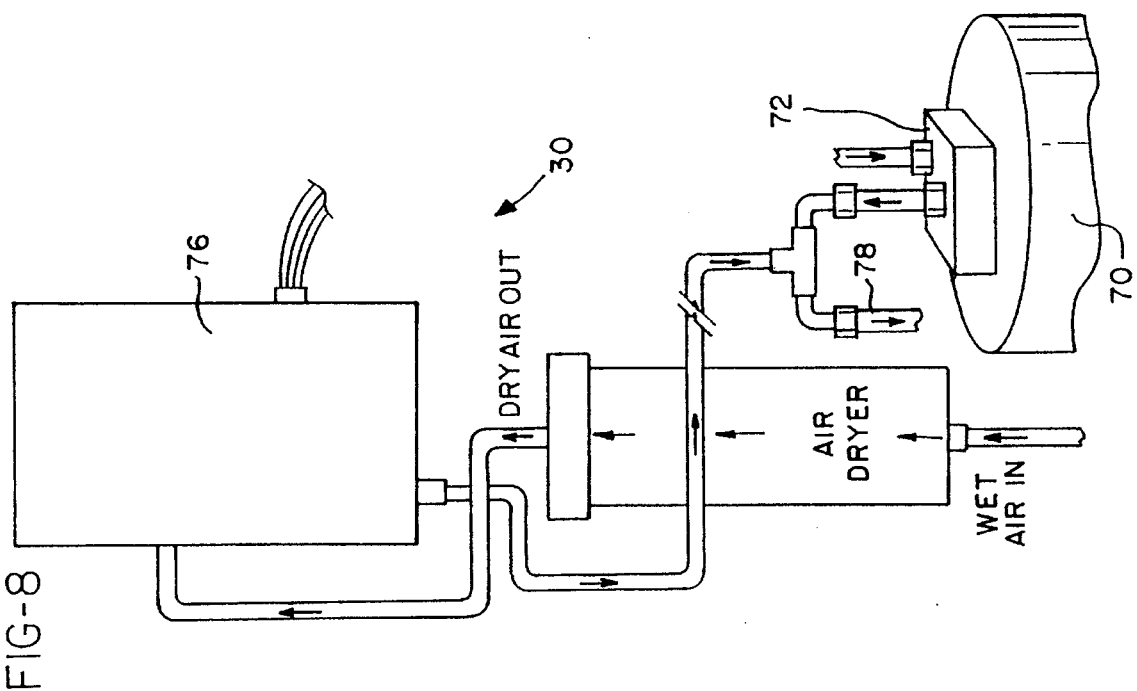
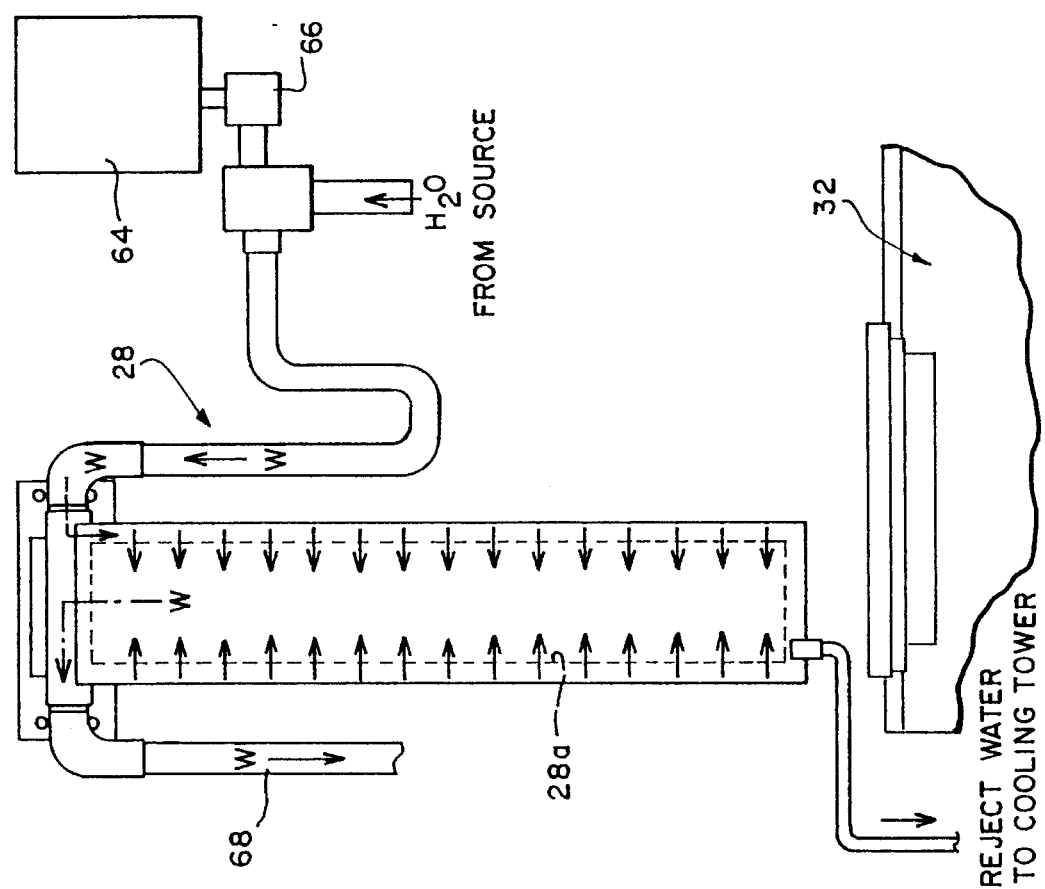

5,582,717

WATER DISPENSER WITH SIDE BY SIDE FILLING-STATIONS

This is a 371 of PCT/US91/06557, filed on Sep. 11, 1991 which is a continuation-in-part of application Ser. No. 07/581,023, filed on Sep. 12, 1990, now U.S. Pat. No. 5,108,590.

BACKGROUND OF THE INVENTION

1. Field of the Invention

This invention relates to apparatus for dispensing purified water. It also relates to two better methods of operating grocery store facilities. In one method the growth of bacteria on produce displayed for sale in a grocery store is inhibited by spraying the produce with the ozonated water from the apparatus. In the second method water is conserved by using waste water from the reverse osmosis unit of the apparatus for the cooling tower of the refrigeration system for the grocery store.

2. Background Discussion

Many grocery stores, particularly large chain stores, have outside, near the entrance of these stores, coin operated vending machines which dispense purified, and in some cases, demineralized drinking water. The customers bring a bottle to the machine, place it in a vending station, and then insert coins into the machine to actuate the machine, causing it to dispense a predetermined quantity of water sufficient to fill the bottle. Because these machines are outside, they are subject to vandalization, and they are exposed to a hostile outdoor environment, which results in rapid deterioration of the machine, leading to frequent service calls.

Grocery stores commonly display fresh produce, fruits and vegetables, which is periodically sprayed with water to maintain the appearance and weight of the produce. Many believe that harmful bacteria grows within the misting system used to spray the produce with water.

Grocery stores usually have a large capacity refrigeration system having cooling towers which use large quantities of cooling water. It is desirable to converse water used in these grocery store refrigeration systems.

SUMMARY OF THE INVENTION

It is the object of tile present invention to provide a self service vending apparatus, which efficiently utilizes space and provides a method of dispensing purified water that gives an economic incentive to the grocery store to keep the apparatus inside the store. The apparatus of this invention is not coin-operated. Rather, the customer simply fills his or her bottle with purified water and then pays for the water when checking out of the grocery store. This eliminates all the mechanical and electronic equipment normally associated with coin-operated vending machines, and it also gives the grocery store an opportunity to make a profit on the sale of the water directly, without the need to collect and account for coin sales.

In accordance with this invention, the water is disinfected using ozone or ultraviolet light. Ozone is preferred because it is carried with the water into the bottle upon dispensing. The disinfected water is stored in sufficient quantity in the apparatus to allow the grocery store to tap into this supply and use the disinfected water for housekeeping and other purposes within the grocery store facility. One of the principal advantages of using disinfected water is to spray this water on produce, when unpacked and displayed for sale within the grocery store. Such spraying helps eliminate product weight loss due to dehydration and eliminates waterspots on mirrors and glassware of the produce display cases.

The apparatus of this invention preferably uses a reverse osmosis unit to purify water from a public supply source. The water passing through a membrane in the reverse osmosis unit is purified, but a large portion is waste water which is normally directed to the public sewerage system. As an optional feature of this invention, this waste water may be fed to the cooling tower of the grocery store's refrigeration system, thereby conserving water.

The apparatus of this invention has several features, no single one of which is solely responsible for its desirable attributes. Without limiting the scope of this invention as expressed by the claims which follow, its more prominent features will now be discussed briefly. After considering this discussion, and particularly after reading the section of this application entitled, "DETAILED DESCRIPTION OF THE PREFERRED EMBODIMENTS," one will understand how the combined features of this invention provide its advantages, which include (i) compactness, speed, convenience of use, and simplification of dispensing, (ii) provision of ozonated or ultraviolet treated water for spraying produce, and (iii) provision for the conservation of water.

The first feature of this invention is that a large capacity storage tank is used to hold a supply of purified and ozonated water. The apparatus includes a housing which provides a rigid support structure. This housing has a base section that has integral therewith the large capacity water storage tank. The storage tank has a capacity ranging between between about 175 and about 250 gallons. This is an adequate supply to handle the needs of both customers and the grocery store facility.

The second feature is that the apparatus is compact. Sitting on top of the base section is an upper section immediately above the base section which includes a water filling station. Preferably, several water filling stations are provided to minimize the time customers need to wait in line to fill their water bottles. The upper section and base section are joined together and contiguous with each other along a common, generally horizontal plane located about waist-high to a typical adult user. This assembly of base and upper sections provides a compact, rigid structure which houses all the necessary pumping and water purification equipment required.

The third feature is that a conventional reverse osmosis unit, or a dionization unit, is used to purify water from any suitable public supply source. The purified water is delivered to the storage tank and retained in this tank until dispensed. There axe means in the storage tank foe detecting when the level of purified water is low, which actuate a pump to pump water from the public supply source into the reverse osmosis unit. Waste water from the reverse osmosis unit can be fed to the cooling tower of the refrigeration system for the grocery store to conserve water. when a dionization unit is used there is no waste water and, therefore, no discharge.

The forth feature is that an ozone generator, preferably located in the upper section, is periodically actuated to generate ozone. This ozone is mixed with the purified water in the storage tank.

The fifth feature is that, as an alternate to ozone treated water, ultraviolet treated water is used. In this case, a pump is periodically actuated to circulate the water in the storage tank past a source of ultraviolet light.

The sixth feature is that tap means are provided in the storage tank for dispensing the ozone or ultraviolet light treated water to a misting unit for spraying produce with ozonated water.

BRIEF DESCRIPTION OF THE DRAWING

The preferred embodiment of this invention, illustrating all its features, will now be discussed in detail. This embodiment depicts the novel and non-obvious methods and apparatus of this invention shown in the accompanying drawing, which is for illustrative purposes only. This drawing includes the following Figs., with like numerals indicating like parts:

FIG. 1 is a perspective view of the water dispensing apparatus of this invention.

FIG. 2 is a left-hand elevational view of the apparatus shown in FIG. 1.

FIG. 3 is a right-hand elevational view of the apparatus shown in FIG. 1.

FIG. 7 is a schematic illustration of the reverse osmosis unit used to purify water from a public source entering the apparatus shown in FIG. 1.

FIG. 8 is a schematic illustration of the ozonation unit used in the apparatus shown in FIG. 1.

DESCRIPTION OF THE PREFERRED EMBODIMENTS OF THE INVENTION

Figure 4:
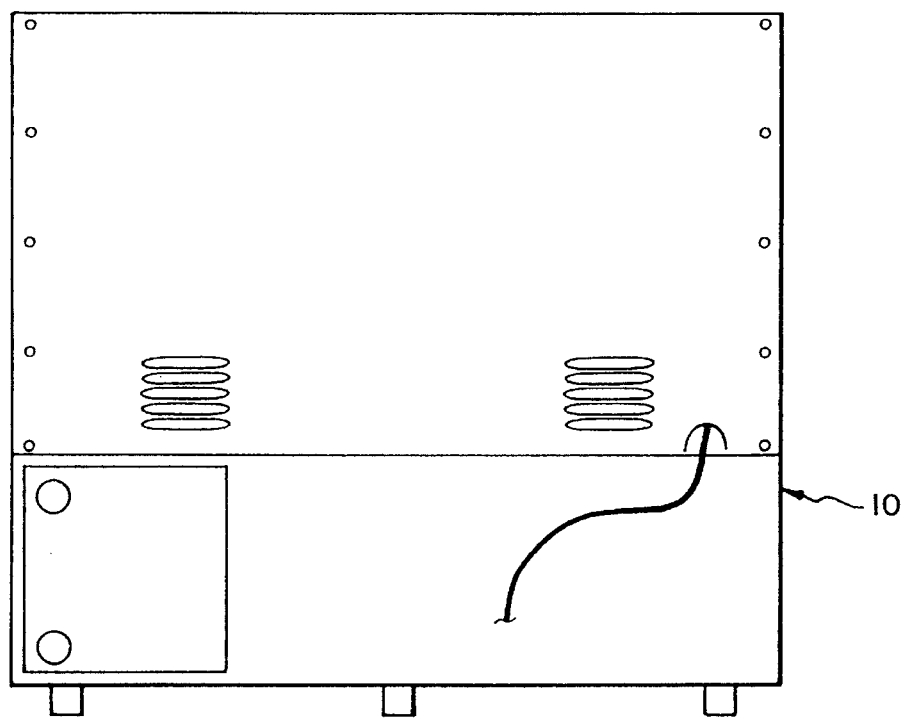
FIG. 4 is a rear elevational view of the apparatus shown in FIG. 1.

As illustrated in FIGS. 1 through 6, the water dispensing apparatus 10 of this invention includes a housing 12 having an upper section 14 and a base section 16. Both the upper and base sections 14 and 16 are made of stainless steel sheets welded together to provide a rigid support structure. Within the housing 12 are a conventional reverse osmosis unit 28 (FIG. 7), including a motor 64 and a pump 66, and a conventional ozonation unit 30 (FIG. 8), including a recirculating motor 70 and a pump 72 In the upper section are a plurality of cubicle-like filling stations 14a into which the customer places empty bottles 40 to be filled with water from the apparatus 10. An optional feature is that the housing 12 may contain a deionization unit through which the water flows prior to exiting the apparatus to reduce the amount of total dissolved solids to less than 10 parts per million.

Figure 10:
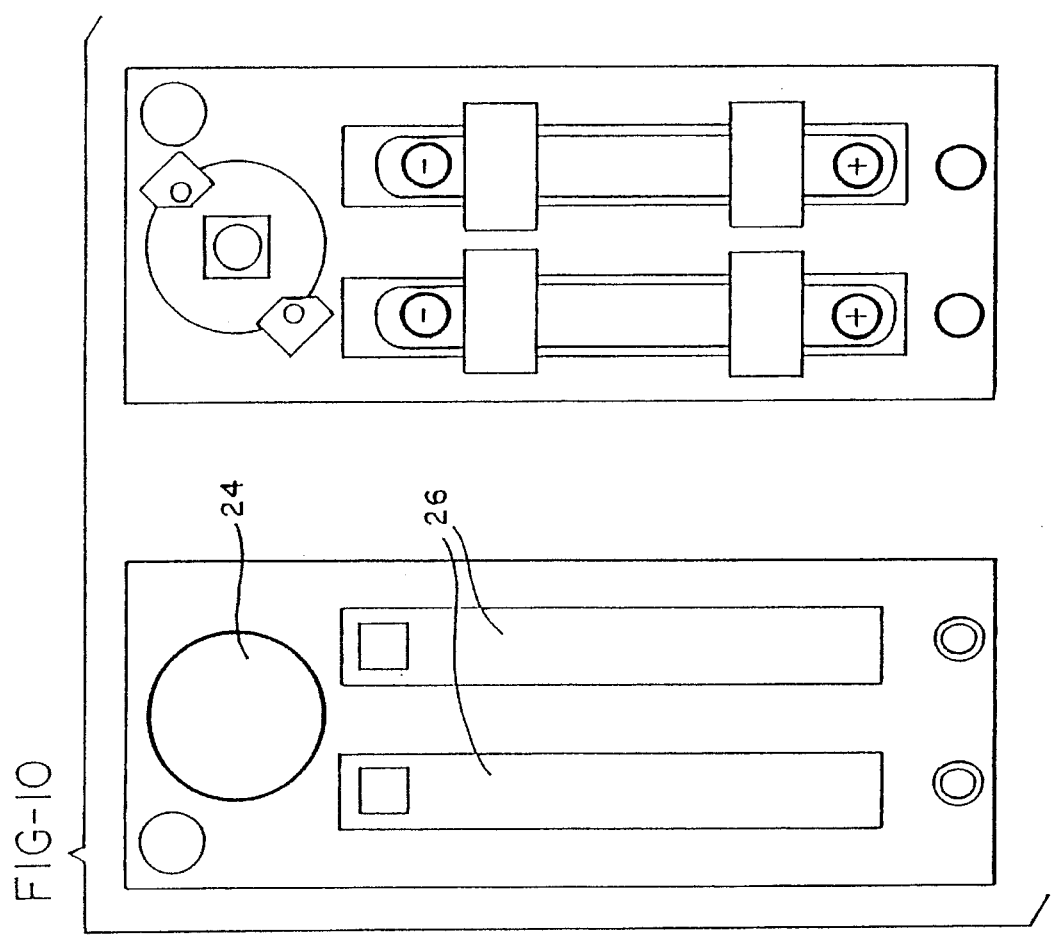
FIG. 10 is a schematic drawing showing the pressure gauges and flow meters foe the reverse osmosis unit shown in FIG. 7.
Figure 9:
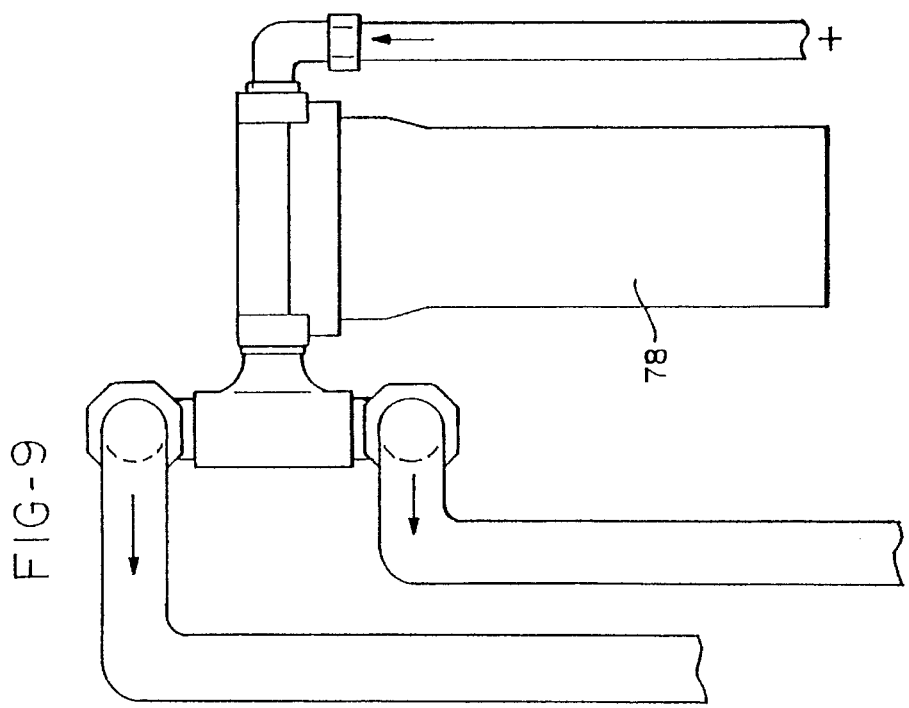
FIG. 9 is a schematic drawing of a 5 micron filter through which purified water flows prior to exiting the apparatus.

The base section 16 has a front door 18 which, when opened, exposes to view an instrument panel, including a pressure gauge 24 and flow meters 26 (FIG. 10) for the reverse osmosis unit 28. When the door 18 is opened, one may check to see what the pressure is and the rate at which water is flowing through the reverse osmosis unit 28 to determine if the membrane 28a (FIG. 7) needs to be replaced. The right side of the base section 16 as viewed in FIG. 1 houses two reverse osmosis pre-filters 20 and 22. On the left side of this base section 16, and integral with the walls of the base section 16, is a box-like water storage tank 32 having a capacity ranging between about 175 and about 250 gallons. An access port to the tank 32 is covered by a heavy plastic cap 32a, including a 0.5 micron air filter which removes bacteria as air enters the tank 32, and a 5 micron carbon filter to strip ozone from exhaust gases expelled from the storage tank. within the base section 16 is a sump tank 34, including a sump pump 36 and sump motor 38 to pump water in the sump tank to the public sewerage system.

An optional tap 37 near the bottom of the storage tank 32 is used to connect the storage tank to a misting system (not shown) for spraying the ozone treated water onto produce. As the ozonated water flows through the misting system it kills bacteria growing in the system. The system is thereby filled with ozonated water which inhibits the renewed growth of bacteria in the misting system. A back flow prevention device such as a check valve 39 prevents a reverse flow of water from the misting system into the storage tank 32.

Both the upper and base sections 14 and 16 are box-like structures which are joined together along a common, generally horizontal plane which is approximately at the waist of a typical adult user. This provides a compact structure that does not take up much space in a grocery store. The upper section 14 is off-set inwardly relative to the front face of the base section 16 to provide a ledge 38 which can be conveniently used to support bottles 40 prior to being placed placed in the filling stations 14a. The overall height of the apparatus 10 is approximately 78 inches. It has a depth of approximately 35 inches, with the offset ledge 38 being approximately 7 inches in width. The width of the apparatus 10 is approximately 16 to 72 inches. Each filling station 14a has an open front 42 approximately 14 inches in width and a height of approximately 23 inches.

Figure 5:
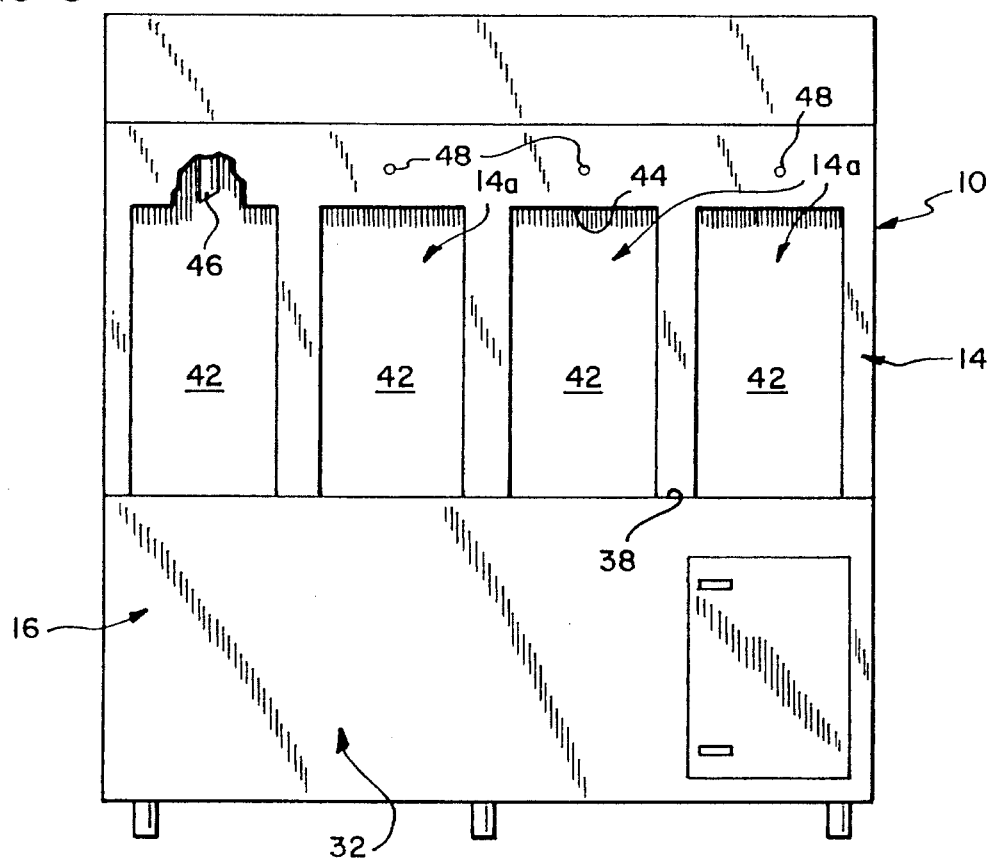
FIG. 5 is a front elevational view of the apparatus shown in FIG. 1.
Figure 6:
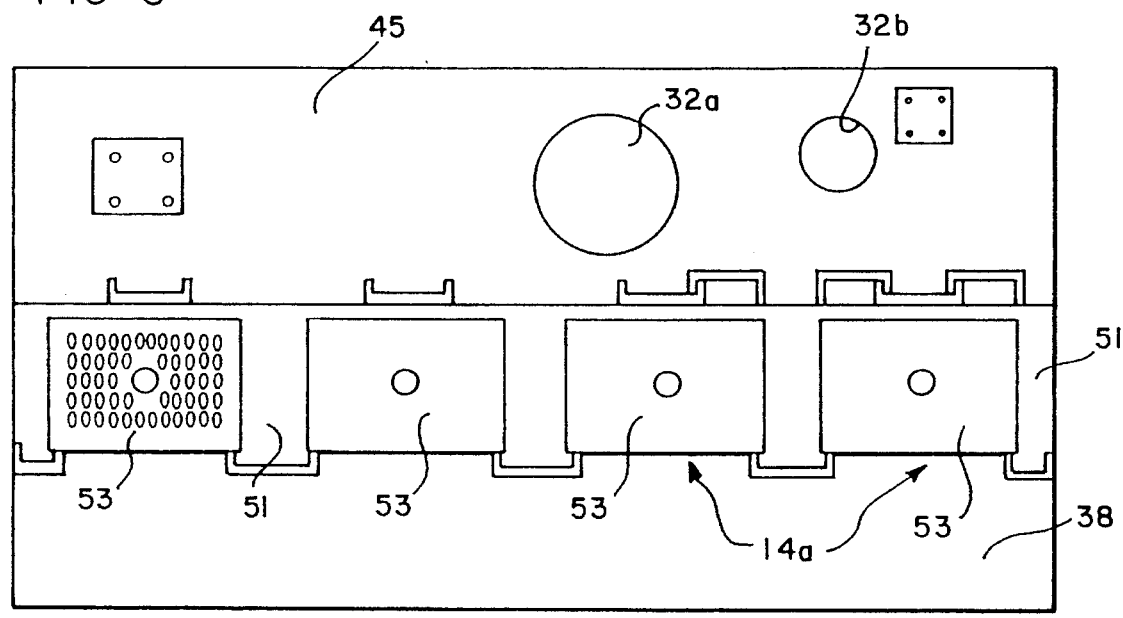
FIG. 6 is a cross-sectional view taken along line 6—6 of FIG. 1.

As best shown in FIG. 5, the upper section 14 has four filling stations 14a (although one could be used), which are in a row with each station having in its upper top wall 44 a downwardly extending spout 46. The water flows through the spout 46 and is delivered to a bottle 40 placed within a filling station 14a. The spouts 46 are preferably designed so that the customer cannot contaminate them. When water is delivered to any filling station 14a, it passes through a carbon filter 78 or a 5 micron post filter prior to exiting the apparatus 10.

Above each filling station 14a is manually-operated control switch 48 which, when actuated, causes energization of a motos 50 fox a booster pump 52 which pumps purified water stored in diaphragm tank 54 through the spout 46 closest to the switch being actuated. Thus, the customer simply places a bottle 40 beneath a spout 46 and actuates the control switch 48 immediately above the filling station into which the bottle is placed to deliver purified water into the bottle. Upon return of the switch 48 to the off position, the flow of purified water from the spout 46 is discontinued. There is a floor 51 in each filling station 14a including a drain 53. These drains 53 are in communication through lines (not shown) with the sump tank 34, so that any water spilled during filling a bottle 40 flows through the drains 53 into the sump tank 34.

Figure 4A:
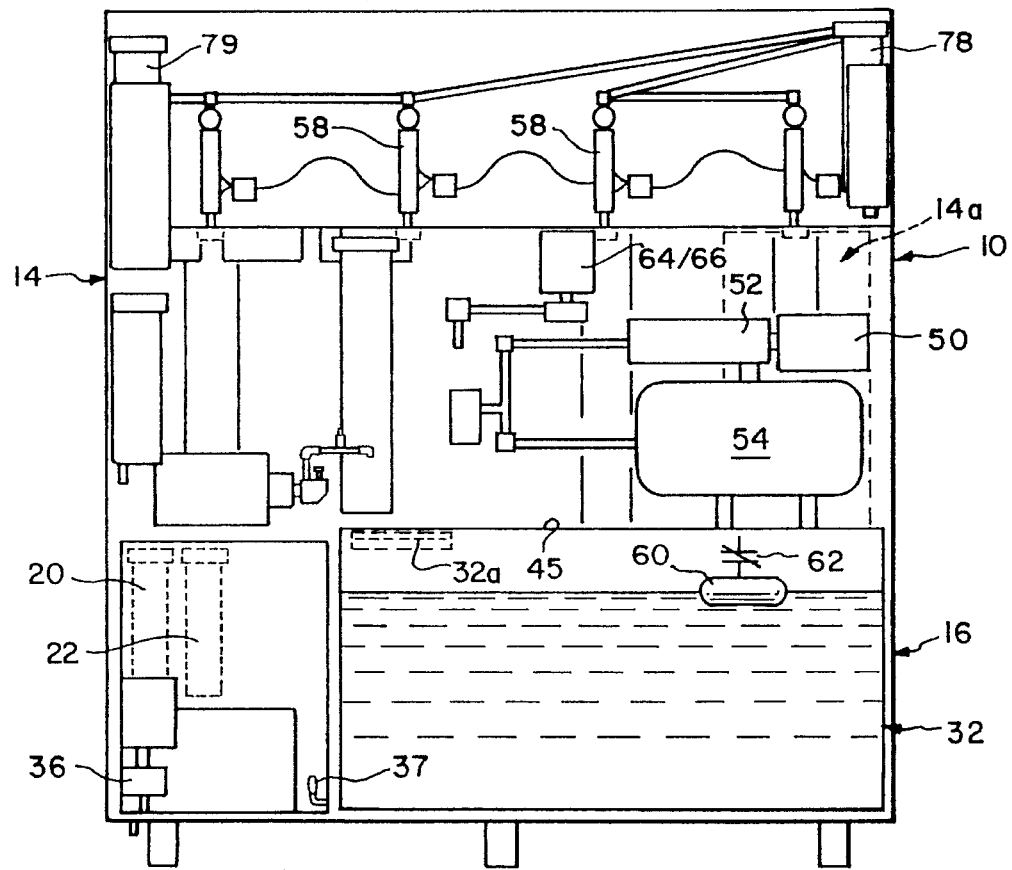
FIG. 4A is a rear elevational view similar to that shown in FIG. 4 with the rear panel removed.

As best illustrated in FIGS. 2, 3, and 4A, the upper section 14 has the ozonation unit 30 contained within it. This upper section 14 also houses the diaphragm tank 54, the booster pump 52, and booster pump motor 50. The diaphragm tank 54 is pressurized at approximately 30 pounds per square inch. There are conventional flow-control units 58 associated with each filling station 14a. These flow-control units 58 regulate the rate of flow of the pressurized water from the diaphragm tank 54 as it is delivered. Purified water leaves the reverse osmosis unit 28 and flows through a line 68 and a 0.2 micron solid block carbon filter 79 into the storage tank 32, with rejected water fed directly to a cooling tower (not shown) for the refrigeration system (not shown) for the grocery store or to a sewerage system. The carbon filter 78 removes any undesirable taste and odor contaminants in the purified water.

A float 60 (FIG. 4A) in the storage tank 32 controls the flow of water from a public supply source into the apparatus 10. When the float 60 moves downwardly as a result of the water level in the storage tank lowering, it closes a control switch 62 to actuate the motor 64 and the pump 66 in the reverse osmosis unit 28, so that water from the public supply source is drawn into the unit to flow through the reverse osmosis pre-filters 20 and 22 into the reverse osmosis unit. A line (not shown) connected to the public source of water extends through an access opening 32b in a partition 45 which separates the upper section 14 from the storage tank 32 and base section 16. when the level of water in the storage tank 32 rises, the switch 62 is opened and the motor 64 operation is discontinued. About 15 minutes within each 90-minute cycle, a timer (not shown) actuates the ozone recirculating motor 70 and pump 72 so that purified water from the storage tank is cycled through a venturi 74 which introduces ozone from an ozone generator 76 into the purified water. The ozonated water is returned to the storage tank 32 through the line 78. The concentration of ozone in the ozonated and purified water in the storage tank 32 is between 0.1 and 0.4 parts per million.

For purposes of clarity the lines and piping placing the various components of apparatus in communication with each other have not been shown. These lines are all conventional and connected using conventional plumbing fixtures.

ALTERNATE EMBODIMENT

Figure 12:
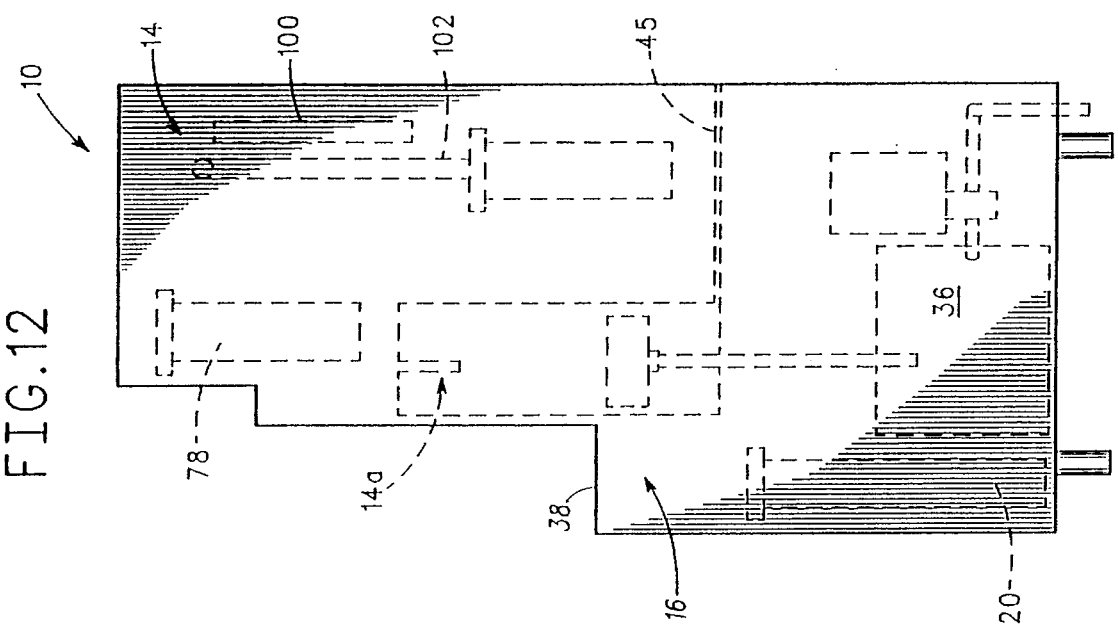
FIG. 12 is a right-hand side elevational view of the apparatus shown in FIG. 11.
Figure 11:
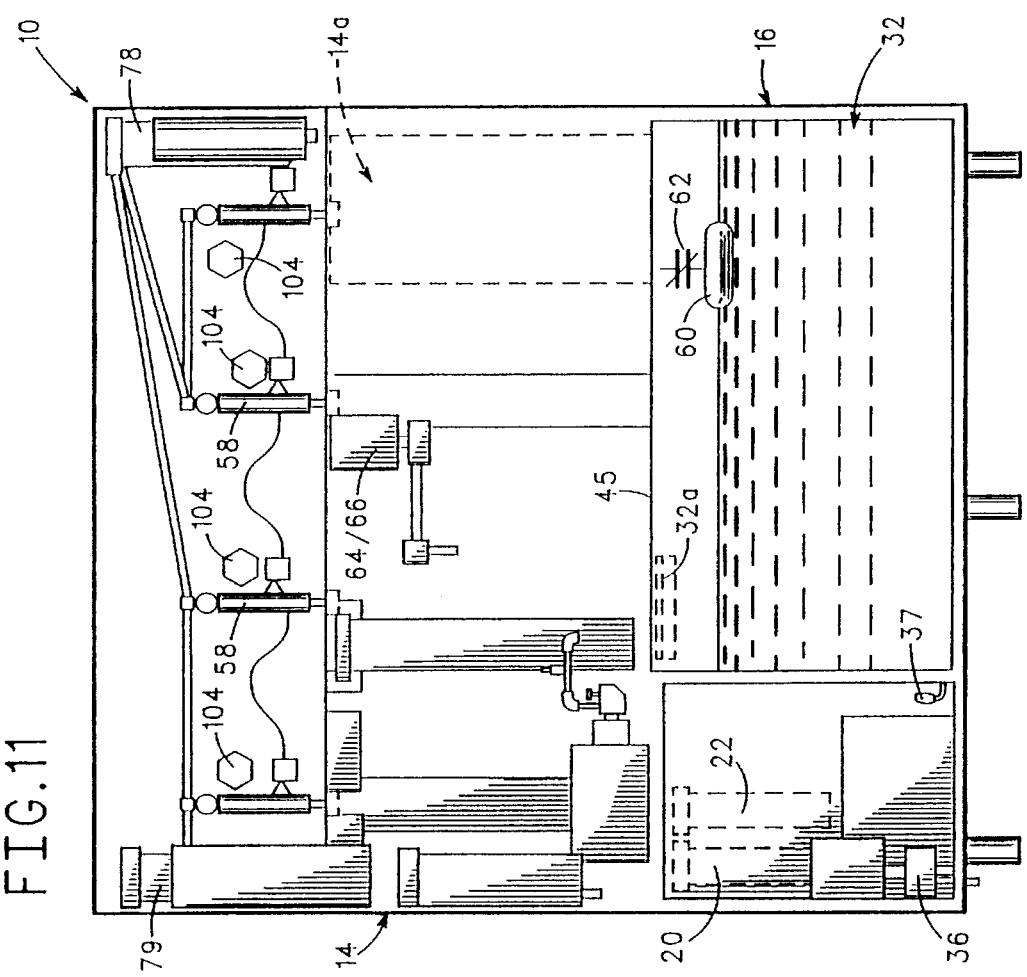
FIG. 11 is a schematic drawing illustrating an alternate embodiment of this invention similar to the apparatus show in FIG. 4A, but using an ultraviolet light source and a modified pumping system.

FIGS. 11 and 12 show an alternate embodiment of this invention using ultraviolet light as a disinfectant for the water and a modified pumping system. In place of the ozonation unit 30 show in FIG. 8, an ultraviolet light source 100 is positioned adjacent a lille 102 which is transparent to ultaviolet light to allow the light to impinge against the water flowing through the line, disinfecting the water. Periodically, water is pumped from the storage tank 32 past the light source 100 to expose the water to the light. In this embodiment, the diaphragm tank 54 and associated booster pump 52 are eliminated. Instead, each filling station 14a has a motorized pump 104 associated with it that pumps water from the storage tank 32 to the spouts 46 when one of the control switches 48 is manually actuated. A deionization unit (not shown) may be used with the ultraviolet light source 100 in the conventional manner.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims:

I claim:

1. A water dispensing apparatus for providing water to a consumer including:

a housing having a plurality of water filling stations disposed side by side along a straight line, thereby allowing positioning of bottles to be filled with water along a flat wall defined by the stations, and further including a ledge extending outward from the housing toward a consumer thereby supporting the bottles to be filled with water;

each of said water filling stations comprising a cubicle having a delivery spout therein, an open front side with vertical wall portions defining a frame into said cubicle into which one of the bottles is placed beneath the spout for filling and a sloped floor including a water drain, the drains being coupled to a sump tank, said sump tank being located below the ledge and the floors;

means for providing an alternate to coin operated water dispensing means including manually operable control means which upon being actuated causes water to flow from one of the spouts into one of bottles placed in one of the cubicles;

pump means for pumping water to one of the spouts in one of the cubicles upon said manually operable control means being actuated;

means for pumping water from a public supply source to the water dispensing apparatus;

a storage tank for storing the water from the public supply source, said tank being integral with walls of a base section of the apparatus and located below said ledge and said floor and said walls extending upwardly to connect with said ledge; and means for purifying the water from the public supply source prior to delivery to one of the spouts.

2. A water dispensing apparatus including:

a housing having a plurality of water filling stations disposed side by side along a straight line and further including a ledge extending outward from walls of the housing toward the consumer thereby supporting bottles to be filled with water;

each of said water filling stations comprising a cubicle, each of the cubicles having a delivery spout within the cubicle, an open front side with vertical wall portions defining a frame into the cubicle into which a water bottle is placed beneath the spout for filling and each of said cubicles having a sloped floor including a drain, the drains being coupled to a sump tank located below the floors;

means providing an alternate to coin operated water dispensing means including manually operable control means which upon being actuated causes water to flow from one of the spouts into a bottle placed in one of the cubicles;

pump means for pumping water to one of the spouts in the cubicles upon the manually operable control means being actuated;

means for pumping water from a public supply source to the water dispensing apparatus;

a storage tank arranged for storing water from the public supply source; and means for purifying the water from the public supply source prior to delivery to the spouts.

3. The apparatus of claim 2, wherein the means for purifying water comprises ultraviolet light.

4. The apparatus of claim 2, wherein the means for purifying water comprises a filter of the reverse osmosis type.

5. The apparatus of claim 2, wherein the means for purifying water comprises an ozone generator means which periodically generates ozone that is mixed with water in the storage tank.

6. The apparatus of claim 2, further including a means for detecting when a level of purified water in the storage tank is low.

7. The apparatus of claim 6, wherein the means for detecting when a level of purified water in the storage tank is low includes a float member in the storage tank.

* * * * *